US005674962A

United States Patent [19]

Ito et al.

[11] Patent Number: 5,674,962

[45] Date of Patent: Oct. 7, 1997

[54] TONER RESIN

[75] Inventors: Hirokazu Ito; Masahiro Itoh, both of Toyohashi; Syuji Takahiro; Keiji Yoshida, both of Nagoya; Motoshi Inagaki, Toyohashi, all of Japan

[73] Assignee: Mitsubishi Rayon Company Ltd., Tokyo, Japan

[21] Appl. No.: 506,245

[22] Filed: Jul. 24, 1995

Related U.S. Application Data

[63] Continuation of Ser. No. 141,018, Oct. 26, 1993, abandoned, which is a continuation-in-part of Ser. No. 800,028, Nov. 29, 1991, abandoned.

[30] Foreign Application Priority Data

Nov. 30, 1990 [JP] Japan .................................... 2-329899

[51] Int. Cl.[6] ........................................ C08F 20/10

[52] U.S. Cl. ........................................ 526/323.1

[58] Field of Search ........................................ 526/323.1

[56] References Cited

U.S. PATENT DOCUMENTS

| | | |
|---|---|---|
| 4,481,274 | 11/1984 | Mitsuhashi et al. . |
| 4,565,766 | 1/1986 | Mitsuhashi et al. . |

FOREIGN PATENT DOCUMENTS

| | | |
|---|---|---|
| 0488238 | 6/1992 | European Pat. Off. . |
| 62-294261 | 12/1987 | Japan . |
| 5-2286 | 6/1991 | Japan . |
| 3197971 | 8/1991 | Japan . |
| 5165251 | 12/1991 | Japan . |
| 1477504 | 6/1977 | United Kingdom . |

OTHER PUBLICATIONS

CA 98 (8):633 05, JP 5782847 May 1982.

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

A toner resin, comprising a styrene component, an acrylic acid ester component or methacrylic acid ester component or both, and a divinyl monomer component, the resin having a glass transition temperature of 50° to 68° C., a value of tan δ, which is the ratio of the dynamic loss to the dynamic elastic modulus, of 0.3 to 0.7 as measured at 200° C., a gel fraction of 55 to 83%, and a softening point at which the resin has a melting viscosity of 100,000 poises is 200° to 410° C. A toner having an excellent fixing property, non-offsetting property, and blocking resistance, and able to be used with a high-temperature high-speed copying machine is formed from this toner resin.

8 Claims, No Drawings

TONER RESIN

CROSS-REFERENCE TO RELATED APPLICATION

This application is a continuation of application Ser. No. 08/141,018, filed on Oct. 26, 1993, now abandoned, which was a continuation-in-part of application Ser. No. 07/800,028, filed on Nov. 29, 1991, now abandoned.

BACKGROUND OF THE INVENTION

1. Field of the Invention

The present invention relates to a toner resin for use in electrophotography, the resin having an excellent non-offsetting property and fixing property.

2. Description of the Related Art

Copying machines or printers utilizing electrophotography must cope with recent increases in the printing speed, and further a toner and a resin used as the main component of the toner, must also cope with a high copying or printing speed.

Accordingly, the flowability of the toner resin is increased by lowering the softening temperature and reducing the molecular weight. Nevertheless, the reduction of the softening temperature or molecular weight of the resin is limited, and therefore, recently a process was adopted in which the temperature of the fixing zone of the copying machine is elevated and the fixing to a paper sheet is carried out in an area where the flowability of the toner (resin) is known to be good, whereby the copying speed is increased. Therefore, a toner resin used for a temperature-elevating high-speed copying machine must have a good fixing property capable of copying with an increased copying speed, and it is necessary to elevate the temperature to maintain the non-offsetting property in the toner.

Currently, a styrene/(meth)acrylic acid ester copolymer resin and a polyester resin are mainly used as the toner resin, and an increase of the molecular weight or increase of the crosslinking degree is adopted to obtain a polyester resin having an excellent fixing property and able to be applied to the above-mentioned temperature-elevating high-speed copying machine. Nevertheless, such an increase of the molecular weight or increase of the crosslinking degree is limited, and thus a satisfactory non-offsetting property cannot be always obtained.

In the styrene/(meth)acrylic acid ester copolymer, an increase of the molecular weight and increase of the crosslinking degree, using the gel proportion as a criterion, can be accomplished relatively easily, and therefore, a similar process has been adopted for the copolymer resin, but even if the non-offsetting property in a high-temperature region can be improved, since the speed is high, the fixing property is often unsatisfactory and a good balance between the non-offsetting property and the fixing property is difficult to maintain.

Therefore, the development of a toner resin having a good non-offsetting property at a high-temperature fixing point and an excellent fixing property capable of coping with an increase of the speed, is urgently required in the art.

The non-offsetting property is influenced by the elastic component of the resin, and the fixing property is influenced by the viscous component of the resin. Therefore, since the toner resin to be used for the above-mentioned high-temperature high-speed copying machine is a viscoelastomer, the rheological characteristics of the resin are greatly influenced by the temperature (the fixing pressure and speed are constant), and thus the non-offsetting property and fixing property also are influenced by the temperature.

SUMMARY OF THE INVENTION

The present inventors carried out investigations into the balance between the elastic component and viscous component in the toner resin, and succeeded in obtaining a toner resin having an excellent non-offsetting property and fixing property able to be used for a temperature-elevating high-speed copying machine.

Therefore, in accordance with the present invention, there is provided a toner resin, comprising a styrene component, an acrylic acid ester component or methacrylic acid ester component or both, and a divinyl monomer component, the resin having a glass transition temperature of 50° to 68° C., a value of tan $\delta$, which is the ratio of the dynamic loss to the dynamic elastic modulus, of 0.3 to 0.7 as measured at 200° C., a gel fraction of 55 to 83%, and a softening point at which the resin has a melting viscosity of 100,000 poises is 200° to 410° C.

DESCRIPTION OF THE PREFERRED EMBODIMENTS

As the styrene component of the toner resin of the present invention, there can be mentioned, for example, styrene, o-methylstyrene, m-methylstyrene, p-methylstyrene, $\alpha$-methylstyrene, p-ethylstyrene, 2,4-dimethylstyrene, p-tert-butylstyrene, p-n-hexylstyrene, p-n-octylstyrene, p-n-nonylstyrene, p-n-dodecylstyrene, p-methoxystyrene, p-phenylstyrene and 3,4-dichlorostyrene. Of these styrene compounds, styrene and $\alpha$-methylstyrene are preferably used, and styrene is especially preferably used.

As the acrylic acid ester component and/or methacrylic acid ester component of the toner resin of the present invention, there can be mentioned, for example, methyl acrylate, ethyl acrylate, n-butyl acrylate, isobutyl acrylate, propyl acrylate, 2-ethylhexyl acrylate, stearyl acrylate, methyl methacrylate, ethyl methacrylate, n-butyl methacrylate, propyl methacrylate, isobutyl methacrylate, 2-ethylhexyl methacrylate, stearyl methacrylate, diethylaminoethyl methacrylate and dimethylaminoethyl methacrylate. Of these compounds, at least one member selected from the group consisting of methyl acrylate, ethyl acrylate, n-butyl acrylate, 2-ethylhexyl acrylate, methyl methacrylate, n-butyl methacrylate and diethylaminoethyl methacrylate is preferably used, and at least one member selected from the group consisting of n-butyl acrylate and n-butyl methacrylate is especially preferably used.

Assuming that the total amount of the styrene component and the acrylic acid ester component and/or methacrylic acid ester component is 100 parts by weight, if the amount of the styrene component is smaller than 50 parts by weight, the glass transition temperature (abbreviated to "Tg") may become lower, and if the amount of the styrene component is increased over 50 parts by weight, the Tg may be elevated. If the acrylic acid ester component and/or methacrylic acid ester component is not used, and the resin is composed solely of the styrene component, the Tg becomes too high and the fixing property becomes poor.

As the divinyl monomer component of the toner resin of the present invention, there can be mentioned, for example, divinylbenzene, ethylene glycol dimethacrylate, 1,3-butylene glycol dimethacrylate, neopentyl glycol dimethacrylate, a bisphenol A derivative diacrylate and a bisphenol A derivative dimethacrylate. Of these compounds, divinylbenzene and 1,3-butylene glycol dimethacrylate are preferably used.

Preferably, the amount of the divinyl monomer component in the toner resin of the present invention is 0.1 to 2 parts by weight per 100 parts by weight of the total amount of the styrene component and the acrylic acid ester component and/or methacrylic acid ester component. If the amount of the divinyl monomer component is within this range, the tan δ of the resin (the ratio of the dynamic loss to the dynamic elastic modulus, defined hereinafter) can be easily controlled.

A known initiator can be used as the polymerization catalyst for the production of the toner resin of the present invention. For example, there can be mentioned benzoyl peroxide, lauryl peroxide, potassium persulfate, ammonium persulfate, 2,2'-azobisisobutyronitile, 2,2-azobis-(2,4-dimethylvaleronitrile) and o-chlorobenzoyl peroxide.

For the preparation of the toner resin of the present invention, there can be adopted an emulsion polymerization process, a suspension polymerization process, a solution polymerization process, an emulsion-suspension polymerization process, a solution-suspension polymerization process, and the like. In the emulsion polymerization and suspension polymerization, known emulsifiers and dispersants can be used, but for the preparation of the toner resin, sodium polyacrylate, a dispersant A formed by the following preparation process, and sodium sulfate as the polymerization stabilizer are preferably used.

The process for preparing the dispersant A will now be described.

A 2-liter reaction vessel equipped with a stirrer, a thermometer, and a gas-introducing tube is charged with 900 g of deionized water, 25 g of methyl methacrylate, and 75 g of 3-sodiumsulfopropyl methacrylate, nitrogen gas is blown into the reaction vessel to expel air from the vessel, and the inner temperature is elevated to 60° C., while stirring, by external heating, and 0.5 g of ammonium persulfate is added to the reaction mixture. The stirring is conducted at the above temperature for 3 hours, to obtain a polymer solution having a bluish-white appearance and a viscosity of 340 cP (at 25° C.) as a suspending dispersant A (having a solid content of about 10%).

The glass transition temperature (abbreviated to "Tg" hereinafter) of the toner resin of the present invention is 50° to 68° C. If the Tg is lower than 50° C., the blocking resistance of the toner becomes poor, and if the Tg is higher than 68° C., the fixing property of the toner becomes unsatisfactory.

In the toner resin of the present invention, tan δ represents the ratio of the dynamic loss to the dynamic elastic modulus and is generally expressed by the following formulae:

$$E^*(\omega) = E'(\omega) + iE''(\omega)$$

$$\eta^*(\omega)\frac{d\gamma}{dt} = [\eta'(\omega) - i\eta''(\omega)]\frac{d\gamma}{dt}$$

$$\mathrm{Tan}\,\delta = \frac{E''(\omega)}{E'(\omega)} = \frac{\eta'(\omega)}{\eta''(\omega)}$$

wherein E*(ω) represents the complex elastic modulus, E'(ω) represents the dynamic elastic modulus, η'(ω) represents the dynamic viscosity, η*(ω) represents the complex elastic viscosity, E"(ω) represents the dynamic loss, ηΔ(ω) represents the ratio of dynamic elastic modulus E'(ω) to ω, ω represents the circular frequency, and γ represents the strain.

In the present invention, tan δ is a value determined at 200° C. Note, the tan δ value of the toner resin of the present invention must be 0.3 to 0.7 at 200° C., as if the tan δ is smaller than 0.3, the fixing property is poor, and if the tan δ is larger than 0.7, the non-offsetting property is unsatisfactory. Namely, the tan δ at 200° C. is within the above-mentioned range, the resin has a good non-offsetting property.

The Tg of the toner resin of the present invention is determined, for example, according to the following process.

A sample is melt-quenched at 100° C. and the Tg is determined according to the DSC method (temperature-elevating speed, 10° C./min).

Furthermore, the tan δ of the toner resin of the present invention is determined, for example, according to the following process. Namely, the temperature is elevated from 100° C. to 200° C. at a rate of 2° C. per minute under the conditions of a sample diameter of 8 mm, a gap of 1 to 2 mm, a frequency of 288 rad/sec, and a strain of 3% by using a rheometer (Model RDA-700 supplied by Rheometrics), and the tan δ of the toner resin of the present invention is measured at 200° C.

The gel fraction of the toner resin of the present invention is 55 to 83%. If the gel fraction is in the outside of this range, the non-offsetting property of the toner becomes poor. Further, the softening point at which the toner resin has a melting viscosity of 100,000 poises is 200° to 410° C. If the softening point is lower than 200° C., the toner has a poor non-offsetting property, and if the softening point is higher than 410° C., the toner has an unsatisfactory fixing property.

The present invention will now be described in detail with reference to the following examples, that by no means limit the scope of the invention.

The blocking resistance, fixing level and non-offsetting property of each of the toners obtained in the examples were evaluated according to the following methods.

A fixing tester wherein the pressure, temperature and speed of the roller could be freely selected was used for testing the fixing property and the non-offsetting property. The roller pressure was set at a nip width of 3 mm and the roller speed was set at 300 m/sec, and the test was carried at various temperatures. The fixing temperature range was defined as the range of from the roll temperature at which the fixing ratio was higher than 90% to the roll temperature at which offsetting occurred. The fixing property and non-offsetting property were evaluated based on this fixing temperature range. A Macbeth reflection densitometer was used for measuring the fixing property, and the ratio of the density of the toner fixed to a paper sheet to the density after a peeling of a tape was determined as the fixing ratio.

For the blocking resistance test, 1 g of the toner was charged in a sample bottle and placed in a hot air drier maintained at 45° C., the sample was then allowed to stand for 50 hours, and thereafter, the blocking resistance was evaluated.

The respective characteristics were evaluated according to the following four-standard methods.

Standards for evaluation of blocking resistance

⊚: Toner was dispersed only by inverting the sample bottom

○: Toner was dispersed when the sample bottle was inverted and tapped once or twice Δ: Toner was dispersed when the sample bottle was inverted and tapped 3 to 5 times x: Toner was not dispersed when the sample bottle was inverted and tapped at least 6 times (⊚, ○, Δ: practically applicable)

Standards for evaluating fixing property

⊚: lowest fixing temperature was up to 184° C.

o: lowest fixing temperature was 185° to 195° C.

Δ: lowest fixing temperature was 196° to 200° C.

x: lowest fixing temperature was 201° C. or higher
(⊚, o, Δ: practically applicable)

Standards for evaluation of non-offsetting property

⊚: hot offset-occurring temperature was higher than 250° C.

o: hot offset-occurring temperature was higher than 230° C.

Δ: hot offset-occurring temperature was higher than 210° C.

x: hot offset-occurring temperature was higher than 190° C.
(⊚, o: practically applicable)

Further, the gel fraction was measured by introducing 0.5 g of a resin sample into 50 ml of tetrahydrofuran, dissolving the resin sample by heating the mixture at 70° C. for 3 hours, filtering the solution with a glass filter over which Celite #545 (diatomaceous earth, manufactured by Johns-Manville) was covered, fully drying the residue on a vacuum dryer at 80° C., and measuring the weight of the dried residue. The gel fraction is a value of the weight of the residue divided by the weight of the resin sample.

The softening point at which the resin has a melting point of 100,000 poises is 200° to 410° C. is a temperature at which the melting viscosity of a resin sample flowing out through a nozzle of a diameter of 1 mm and a length of 10 mm is 100,000 poises. The melting point was measured by using Shimazu Flow Tester CFT-500 with a plunger of a crosssectional area of 1 $cm^2$ under a load of 30 kgw at a heating rate of 3° C./min.

EXAMPLE 1

A mixture of 2000 parts by weight of deionized water, 3.3 parts by weight of sodium polyacrylate (the solid content was 3.3%), 4.4 parts by weight of dispersant A prepared according to the above-mentioned process, and 5 parts by weight of sodium sulfate was charged in a reaction vessel equipped with a cooling tube, a stirrer and a thermometer, and then styrene, n-butyl acrylate, n-butyl methacrylate, divinylbenzene, and benzoyl peroxide were mixed according to a recipe shown in Table 1, and the mixture charged to the reaction vessel. The temperature in the reaction vessel was elevated to 88° C., by heating with hot water from the outside the vessel, while maintaining the stirring rotation rate at 350 rpm, whereby a suspension polymerization was initiated. After about 2 hours had passed from the point of elevation of the inner temperature to 88° C., the inner temperature and outer temperature were reversed, and the inner temperature was maintained at 88° C. for about 1 hour to complete the polymerization. The cooling tube was replaced by a distilling column, and the inner temperature was elevated to 100° C. by a mantle heater to effect a distillation at 20% based on the deionized water. Then, the inner temperature was maintained at 90° C., 5 parts by weight of caustic soda were added to the reaction mixture, and the reaction mixture was water-cooled to below 40° C. Accordingly, resins A through E were obtained, and these resins were dried for 24 hours. The obtained resins were white and transparent, and the characteristics of these resins A through E are shown in Table 1.

Then, 95 parts by weight of each of the resins A through E, and 5 parts by weight of carbon black, were melt-kneaded at 200° C. by using a twin-screw extruder, and toners AT through ET having a particle size of 10 to 20 μm were formed by using a Jet mill and a classifying machine.

The fixing property, non-offsetting property, and blocking resistance of the toners AT through ET were evaluated, and the results are shown in Table 1. From Table 1, it is seen that each of the toners AT through ET had an excellent fixing property, non-offsetting property, and blocking resistance.

TABLE 1

| | | Composition (parts by weight) | | | | | Characteristic Values of Resin | | | |
|---|---|---|---|---|---|---|---|---|---|---|
| | Resin | St | n-BA | n-BMA | DVB | BPO | Tg (°C.) | Tan δ | Gel Fraction (%) | Softening Point (°C.) |
| Example 1 | A | 800 | 200 | — | 4.6 | 30 | 62.0 | 0.63 | 57.5 | 245 |
| | B | 800 | 200 | — | 5.4 | 30 | 62.5 | 0.46 | 68.0 | 305 |
| | C | 800 | 200 | — | 5.7 | 30 | 63.0 | 0.36 | 77.0 | 373 |
| | D | 620 | — | 380 | 5.4 | 30 | 57.5 | 0.52 | 62.0 | 292 |
| | E | 560 | — | 440 | 5.4 | 30 | 52.0 | 0.58 | 60.0 | 260 |

| | | Characteristics of Toner | | | | |
|---|---|---|---|---|---|---|
| | Resin | Toner Symbol | Blocking Resistance | Fixing Temperature Width (°C.) | Fixing Property | Non-Offsetting Property |
| Example 1 | A | AT | ⊚ | 160–230 | ⊚ | ○ |
| | B | BT | ⊚ | 185–250 | ○ | ⊚ |
| | C | CT | ⊚ | 198–265 | Δ | ⊚ |
| | D | DT | ○ | 175–250 | ⊚ | ⊚ |
| | E | ET | Δ | 165–250 | ⊚ | ⊚ |

Note
Monomer symbols in Table 1:
St: styrene, n-BA: n-butyl acrylate, n-BMA: n-butyl methacrylate, DVB: divinylbenzene, BPO: benzoyl peroxide
Characteristic values in Table 1:
Tg: glass transition temperature (°C.), tan δ: tan δ at 200° C.

EXAMPLE 2

Resins were prepared in the same manner as described in Example 1, except that styrene, n-butyl methacrylate, 1,3-butylene glycol dimethacrylate, and benzoyl peroxide were reacted according to recipes shown in Table 2. The physical properties of the obtained resins F and G are shown in Table 2.

Toners FT and GT were formed from the resins F and G, under the same conditions as described in Example 1, and the toner characteristics were evaluated. The results are shown in Table 2. From the results shown in Table 2, it is seen that the toners FT and GT had an excellent fixing property, non-offsetting property, and blocking resistance.

TABLE 2

| | | Composition (parts by weight) | | | | Characteristic Values of Resin | | | |
|---|---|---|---|---|---|---|---|---|---|
| | | | | | | | | Gel Fraction | Softening Point |
| | Resin | St | n-BMA | BDMA | BPO | Tg (°C.) | Tan δ | (%) | (°C.) |
| Example 2 | F | 620 | 380 | 10.6 | 30 | 57.5 | 0.65 | 55.5 | 235 |
| | G | 620 | 380 | 16.0 | 30 | 58.0 | 0.40 | 75.0 | 345 |

| | | Toner Characteristics | | | | |
|---|---|---|---|---|---|---|
| | Resin | Toner Symbol | Blocking Resistance | Fixing Temperature Width (°C.) | Fixing Property | Non-Offsetting Property |
| Example 2 | F | FT | ○ | 160–230 | ⊙ | ○ |
| | G | GT | ○ | 190–265 | ○ | ⊙ |

Note
Monomer symbols in Table 2:
St: styrene, n-BMA: n-butyl methacrylate, BDMA: 1,3-butylene glycol dimethacrylate, BPO: benzoyl peroxide
Characteristic values in Table 2:
Tg: glass transition temperature (°C.), tan δ: tan δ at 200° C.

EXAMPLE 3

Resins were prepared in the same manner as described in Example 1, except that styrene, n-butyl methacrylate, ethyl acrylate, methyl acrylate, divinylbenzene, and benzoyl peroxide were reacted according to recipes shown in Table 3. The physical properties of the obtained resins H through J are shown in Table 3.

Toners HT through JT were formed from the resins H through J, under the same conditions as described in Example 1, and the toner characteristics were evaluated. The results are shown in Table 3. From the results shown in Table 3, it is seen that the toners HT through JT had an excellent fixing property, non-offsetting property, and blocking resistance.

TABLE 3

| | | Composition (parts by weight) | | | | | | Resin Characteristic Values | | | |
|---|---|---|---|---|---|---|---|---|---|---|---|
| | | | | | | | | | | Gel Fraction | Softening Point |
| | Resin | St | n-BMA | EA | MA | DVB | BPO | Tg (°C.) | Tan δ | (%) | (°C.) |
| Example 3 | H | 700 | — | — | 300 | 4.6 | 30 | 65.8 | 0.52 | 65.0 | 265 |
| | I | 700 | — | 300 | — | 5.7 | 28 | 52.0 | 0.45 | 72.0 | 322 |
| | J | 580 | 370 | 50 | — | 5.5 | 30 | 51.0 | 0.65 | 61.0 | 220 |

| | | Toner Characteristics | | | | |
|---|---|---|---|---|---|---|
| | Resin | Toner Symbol | Blocking Resistance | Fixing Temperature Width (°C.) | Fixing Property | Non-Offsetting Property |
| Example 3 | H | HT | ⊙ | 165–250 | ⊙ | ⊙ |
| | I | IT | Δ | 190–265 | ○ | ⊙ |
| | J | JT | Δ | 165–230 | ⊙ | ○ |

Note
Monomer symbols in Table 3:
St: styrene, n-BMA: n-butyl methacrylate, DVB: divinylbenzene, BPO: benzoyl peroxide, EA: ethyl acrylate, MA: methyl acrylate
Characteristic values in Table 3:
Tg: glass transition temperature (°C.), tan δ: tan δ at 200° C.

COMPARATIVE EXAMPLE 1

Resins were prepared in the same manner as described in Example 1, except that styrene, n-butyl acrylate, n-butyl methacrylate, divinylbenzene, and benzoyl peroxide were reacted according to recipes shown in Table 4. The physical properties of the obtained resins K through N are shown in Table 4.

Toners KT through NT were formed from the resins K through N under the same conditions as described in Example 1, and the toner characteristics were evaluated. The results are shown in Table 4. From the results shown in Table 4, it is seen that the toner KT had a poor non-offsetting property, the toner LT had a poor non-offsetting property and blocking resistance, and the toners MT and NT had a poor fixing property.

TABLE 4

| | Resin | Composition (parts by weight) St | n-BA | n-BMA | DVB | BPO | Resin Characteristic Values Tg (°C.) | Tan δ | Gel Fraction (%) | Softening Point (°C.) |
|---|---|---|---|---|---|---|---|---|---|---|
| Comparative Example 1 | K | 800 | 200 | — | 4.2 | 30 | 62.0 | 0.82 | 47.0 | 180 |
| | L | 400 | — | 600 | 5.4 | 30 | 36.3 | 0.81 | 48.5 | 178 |
| | M | 560 | — | 440 | 6.5 | 30 | 52.0 | 0.21 | 86.0 | 445 |
| | N | 900 | 100 | — | 5.4 | 30 | 75.0 | 0.40 | 77.0 | 360 |

| | Resin | Toner Symbol | Toner Characteristics Properties: Blocking Resistance | Fixing Temperature Width (°C.) | Fixing Property | Non-Offsetting Property |
|---|---|---|---|---|---|---|
| Comparative Example 1 | K | KT | ◎ | 160–190 | ◎ | X |
| | L | LT | X | 140–215 | ◎ | Δ |
| | M | MT | Δ | 215–265 or higher | X | ◎ |
| | N | NT | ◎ | 215–250 | X | ◎ |

Note
Monomer symbols in Table 4:
St: styrene, n-BA: n-butyl acrylate, n-BMA: n-butyl methacrylate, DVB: divinylbenzene, BPO: benzoyl peroxide
Characteristic values in Table 4:
Tg: glass transition temperature (°C.), tan δ: tan δ at 200° C.

EXAMPLE 4

A mixture of 6000 parts of deionized water and 4 parts by weight of dispersant A was charged in a reaction vessel equipped with a cooling tube, a stirrer, and a thermometer, and styrene, n-butyl acrylate, n-butyl methacrylate, divinylbenzene and potassium persulfate were mixed according to a recipe shown in Table 5, and charged in the reaction vessel.

Then, $N_2$ gas was introduced into the reaction vessel for about 1 hour, and while maintaining the stirring rotation number at 175 rpm, the inner temperature of the reaction vessel was elevated to 70° C. under a flow of $N_2$ gas, by heating with hot water from outside of the reaction vessel. After a return current was generated, an emulsion polymerization was initiated, and after about 6 hours, from the point at which the inner temperature reached 70° C., the return current was ended and the emulsion temperature procedure was terminated. Then, the temperature of the reaction mixture was elevated to 90° C., and an aqueous mixture comprising 970 parts by weight of deionized water and 30 parts by weight of hydrochloric acid was dropwise added to the reaction mixture over about 4 hours to form a resin solid from the emulsion, and the resin solid was cooled to obtain resins O through S, which were cooled for about 24 hours.

The characteristic properties of the obtained resins O through S are shown in Table 5.

Toners OT through ST were formed from the resins O through S under the same conditions as described in Example 1, and the toner characteristics were evaluated. The results are shown in Table 5. From the results shown in Table 5, it is seen that the toners TO through ST had an excellent fixing property, non-offsetting property, and blocking resistance.

TABLE 5

| | Resin | St | n-BA | n-BMA | DVB | KPS | Tg (°C.) | Tan δ | Gel Fraction (%) | Softening Point (°C.) |
|---|---|---|---|---|---|---|---|---|---|---|
| | | Composition (parts by weight) | | | | | Resin Characteristic Values | | | |
| Example 4 | O | 800 | 200 | — | 1.5 | 2 | 60.0 | 0.65 | 60.0 | 240 |
| | P | 800 | 200 | — | 2.5 | 2 | 61.8 | 0.51 | 66.0 | 285 |
| | Q | 800 | 200 | — | 3.7 | 2 | 62.0 | 0.35 | 82.0 | 380 |
| | R | 850 | 150 | — | 1.5 | 2 | 66.0 | 0.38 | 80.0 | 366 |
| | S | 580 | — | 370 | 3.7 | 2 | 51.0 | 0.65 | 60.0 | 226 |

| | Resin | Toner Symbol | Blocking Resistance | Fixing Temperature Width (°C.) | Fixing Property | Non-Offsetting Property |
|---|---|---|---|---|---|---|
| | | | Toner Characteristics | | | |
| Example 4 | O | OT | ◎ | 165–230 | ◎ | ○ |
| | P | PT | ◎ | 175–250 | ◎ | ◎ |
| | Q | QT | ◎ | 198–265 | Δ | ◎ |
| | R | RT | ◎ | 198–265 | Δ | ◎ |
| | S | ST | Δ | 165–230 | ◎ | ○ |

Note
Monomer symbols in Table 5:
St: styrene, n-BA: n-butyl acrylate, n-BMA: n-butyl methacrylate, DVB: divinylbenzene, KPS: sodium persulfate
Characteristic values in Table 5:
Tg: glass transition temperature (°C.), tan δ: tan δ at 200° C.

As apparent from the foregoing description, the toner resin of the present invention, constructed while taking the rheological characteristics into consideration, provides a toner from a high-temperature high-speed copying machine, the toner having an excellent non-offsetting property, fixing property, and blocking resistance, and therefore, the speed of a copying machine or printer can be increased by using this toner.

We claim:

1. A toner resin, consisting essentially of a styrene component, an n-butyl acrylate component or n-butyl methacrylate component or both, and a divinyl component, the resin having a glass transition temperature of 50° to 68° C., a value of tan δ, which is the ratio of the dynamic loss to the dynamic elastic modulus, of 0.3 to 0.7 as measured at 200° C., a gel fraction of 55 to 83%, and a softening point at which the resin has a melting viscosity of 100,000 poises is 200° to 410° C.

2. The toner resin of claim 1, wherein the styrene component is provided by polymerized units of at least one member selected from the group consisting of styrene, o-methylstyrene, m-methylstyrene, p-methylstyrene, α-methylstyrene, p-ethylstyrene, 2,4-dimethylstyrene, p-tert-butylstyrene, p-n-hexylstyrene, p-n-octylstyrene, p-n-nonylstyrene, p-n-dodecylstyrene, p-methoxystyrene, p-phenylstyrene and 3,4-dichlorostyrene.

3. The toner resin of claim 2, wherein said styrene component is provided by polymerized units of at least one member selected from the group consisting of styrene and α-methylstyrene.

4. The toner resin of claim 1, wherein the styrene component is provided by polymerized units of styrene.

5. The toner resin of claim 1, wherein the divinyl monomer component is provided by polymerized units of least one member selected from the group consisting of divinylbenzene ethylene glycol dimethacrylate, 1,3-butylene glycol dimethacrylate, neopentyl glycol dimethacrylate, a bisphenol A derivative diacrylate and a bisphenol A derivative dimethacrylate.

6. The toner resin of claim 5, wherein the divinyl monomer component is provided by polymerized units of at least one member selected from the group consisting of divinylbenzene and 1,3-butylene glycol dimethacrylate.

7. The toner resin of claim 1, wherein the amount of the divinyl component is 0.1 to 2.0 parts by weight per 100 parts by weight of the total amount of the styrene component and the acrylic acid component or methacrylic acid ester component or both.

8. The toner resin of claim 1, which has a glass transition temperature of 51° C. to 66° C., and a tan δ value of 0.35 to 0.65.

* * * * *